United States Patent [19]

Olnowich

[11] Patent Number: 4,493,026
[45] Date of Patent: Jan. 8, 1985

[54] SET ASSOCIATIVE SECTOR CACHE

[75] Inventor: Howard T. Olnowich, Endwell, N.Y.

[73] Assignee: International Business Machines Corporation, Armonk, N.Y.

[21] Appl. No.: 382,040

[22] Filed: May 26, 1982

[51] Int. Cl.³ .............................................. G06F 13/00
[52] U.S. Cl. .................................................... 364/200
[58] Field of Search .............................. 364/200, 900

[56] References Cited

U.S. PATENT DOCUMENTS

| 3,800,292 | 3/1974 | Curley et al. | 364/200 |
|---|---|---|---|
| 4,217,640 | 8/1980 | Porter et al. | 364/200 |
| 4,320,451 | 3/1982 | Bachman et al. | 364/200 |
| 4,325,120 | 4/1982 | Colley et al. | 364/200 |
| 4,363,095 | 12/1982 | Woods et al. | 364/200 |
| 4,370,710 | 1/1983 | Kroft | 364/200 |
| 4,371,929 | 2/1983 | Brann et al. | 364/200 |
| 4,413,317 | 11/1983 | Swenson | 364/200 |
| 4,424,561 | 1/1984 | Stanley et al. | 364/200 |
| 4,467,421 | 8/1984 | White | 364/200 |

Primary Examiner—Gareth D. Shaw
Assistant Examiner—Jameson Lee
Attorney, Agent, or Firm—John H. Bouchard

[57] ABSTRACT

A cache memory for a data processing system having a tag array in which each tag word represents a predetermined plurality or block group of consecutively addressable data block locations in a data array. The lower order set address bits concurrently access the tag word and its associated group of block locations in the data array while individual blocks within the group are accessed by supplemental block bits. Each tag word read out must compare equal with the high order bits of the address and an accompanying validity bit for each block location in its group must be set in order to effect a hit. Also described are circuits for writing into the cache and adapting the cache to a multi-cache arrangement.

7 Claims, 5 Drawing Figures

SET ASSOCIATIVE SECTOR CACHE

BACKGROUND OF THE INVENTION

The invention relates to data processing systems and more particularly to such systems employing a high-speed buffer or cache in combination with a main store that is available to one or more processors.

Data processing systems frequently employ a high-speed auxiliary buffer storage or cache to temporarily hold data or instructions for fast access thus obviating the fetch requests to the slower operating main memory or backing store. Data are transferred to the cache from the main memory after interrogating the cache and finding the requested data missing. The required data are fetched from the backing store to an allotted portion of the cache for both the immediate and future use. Since the backing store is usually much larger than the cache, several efforts have been undertaken to efficiently map data from the backing store into the cache. Four techniques are described in an article by C. J. Conti entitled "Concepts for Buffer Storage" published in the *IEEE Computer Group News,* March 1969, pages 9-13.

In the first of these, the sector technique, a sector of data from backing store, comprising a large number of blocks, is mapped into any one of the sectors of the cache, one block at a time. The cache is usually capable of holding only a small number of sectors and each cache sector, at any given time, can contain only blocks from within the same sector of the backing store. The logic required to keep track of which data is in cache is simple. This system requires only one tag per sector and one validity bit per block for searching the cache to determine a "hit". Although any sector of the backing store can be transferred into any sector of the cache, each cache sector must be held open for the missing blocks of the stored sector until replaced by a different sector. This approach becomes somewhat cumbersome in the transfer of data and lacks flexibility in the selection of a few necessary data blocks from among several sectors.

In the second technique, that of the direct mapping into cache, only a block of data is transferred per request and it is preassigned to a certain tag address within the cache. If there are n blocks in the cache, then every Nth block from the backing store is preassigned to the same tag address. The concept of grouping blocks into sectors is no longer required. This arrangement is hardware efficient but lacks flexibility. Other cache methods (such as the fourth technique below) expand on this method to add flexibility. A third technique of buffered storage is the fully associative, and in this scheme any data block may be mapped from the backing store to any data block in the cache. Although this obviates the difficulty of contention, either much hardware or much searching time is required since the tags of all data blocks must be searched. In the fourth scheme described, that of set associative, preassigned blocks are mapped into a set of cache locations using the direct mapping technique. Although this scheme reduces much of the hardware required by the fully associative cache, and the problem of contention, it has the disadvantage of requiring a tag address for each stored block. In this respect it can be reduced further without the loss of efficiency.

These previous attempts at cache organization generally have gone to two extremes, they either transferred a surplus of data or provided a large number of tags, using one tag for every data block stored in the cache. Thus, these caches are either inefficient or the number of circuits become complex and their cost is escalated. From another view, the transfer of a sector is frequently too large. There remains a need for an intermediate sized quantity of data that is much smaller than a sector, yet is greater than a typical block and can be associated with one tag address.

It is accordingly a primary object of this invention to provide a buffer storage or set associative cache system of tag and data arrays in which each tag address provides access to a plurality of data blocks in the data array.

Another important object of this invention is to provide a cache arrangement for a data processing system in which the tag array is smaller in proportion to the data array thus permitting improved circuit efficiencies and decreased costs.

Yet another object of this invention is to provide a cache arrangement in which a single tag address is combined with data block identification bits to access one of a plurality of blocks for that tag address.

Still another object of this invention is to provide a cache arrangement which is readily adaptable to a multiprocessor system.

The foregoing objects are obtained in accordance with the invention by providing buffer storage or cache means having tag and data arrays in which each tag array location has associated therewith a plurality of consecutive data array locations each arranged to store a block of data from the same sector of backing store. The group of data blocks are directly mapped into the data array locations but main store sectors are merely associatively mapped. Since the groups of data blocks are directly mapped, each block location, regardless of sector, can be stored only in its preassigned data array location so that during a fetch only the one tag address holding the group identification needs to be searched to determine the presence or absence of the desired block group in the cache. The presence of each individual block within a group is based upon individual validity bits. The search for the desired word in cache is successful, called a "hit", if the block group is present in cache and the particular block required is valid; otherwise, a "miss" is detected. As single blocks of data are fetched from the backing store and transferred to cache, their validity is designated by appropriate validity bits stored in conjunction with the tag words. A replace array can be also used with the set associative sector cache of the invention to define the least recently used tag word and block group for replacement.

Since each tag word can access a plurality of locations in the data array, there is the advantage of less tag storage capacity required, hence, fewer circuits and lower costs. As in the set associative buffer storage, searching of both the tag and data arrays can be done concurrently; thus for a "hit" or a "miss" the designated data block can be either gated or suppressed from the data array. The ability to fetch single blocks from backing store eliminates a significant number of accesses and much of the transfer time heretofore required for larger units of cache-stored data. A further convenience is that of storing the block validity bits with the sector identification in the tag, enabling an earlier determination of the reliability of the information. This arrangement further reduces the number of registers required thereby enabling circuit simplification.

DESCRIPTION OF THE PREFERRED EMBODIMENT

Figure 1:
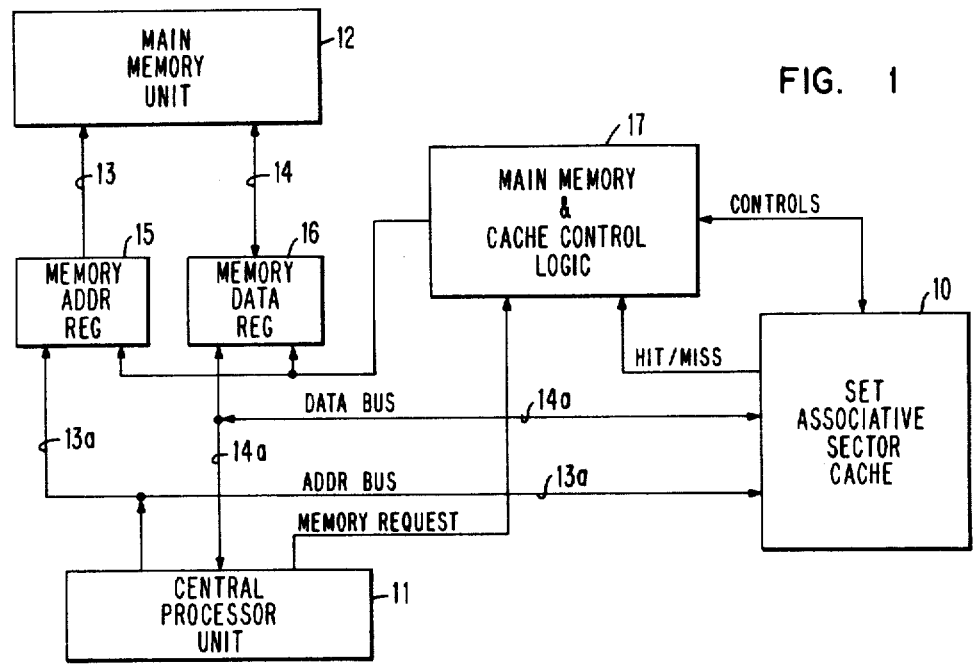
FIG. 1 is a simplified block diagram of a conventional data processing system including a cache memory.

Referring to FIG. 1, there is schematically shown a typical data processing system employing a buffer memory. It comprises generally the set associative sector cache 10 of the invention serving as the high speed buffer store for central processing unit 11 whose instructions and operands reside in main memory 12. Fetch addresses of instructions or data to be retrieved are transmitted along bus 13 via memory address register 15. Data read from or written into memory are transmitted along bus A via memory data register 16. Cache 10 is also connected to each of these buses via buses 13a and 14a for receiving addresses or data from either processor 11 or main memory 12. Cache 10 transmits data to the processor when the requested data are resident therein. Control circuits, indicated generally as 17, receive fetch requests from processor unit 11 and gate requests to the cache or the address and data registers.

When the processing unit 11 requires a memory access, it places the address of that instruction or data on address buses 13a and concurrently issues a memory request to control logic unit 17. The address is transmitted to cache 10 and stored in memory address register 15. The cache is a random access memory and serves as a high speed repository for data obtained earlier from main memory. Upon receipt of the address a determination is made as to whether the cache contains the requested data. If the requested data is available from cache, a "hit" is signaled and logic unit 17 gates the requested data onto data bus 14a to the processor unit. This completes a memory data transfer without accessing main memory unit 12. If cache 10 does not contain the requested data, a "miss" is signaled and control logic 17 gates memory address register 15 to initiate a memory fetch cycle from main memory. Data obtained from main memory is then brought to memory data register 16 and placed on data bus 14a to the processing unit and to the cache for storage therein for future requests.

In the ensuing description the following words will be used to describe segments of main memory. For example, "sector" is the largest subdivision of main memory and is a large group of memory locations and "data block" or "block", a small portion of a sector, is intended to mean a basic unit in main memory such as the amount of data accessed by one memory fetch. "Word" is a subdivision of a data block and "byte" is a further subdivision of a data word. As an example, main memory may have 16,384 sectors with each sector having 4,096 blocks where each block has eight words and each word contains eight bytes. The term "block group" defines a unit of storage of main memory and the set associative sector cache of the invention. Each block group is a basic unit of the cache memory and includes all of the plurality of data blocks which are accessible by a single tag word containing ancillary binary bits such as validity or parity bits. Parity bits will not be made a further part of this discussion since their use is well known.

Figure 2:
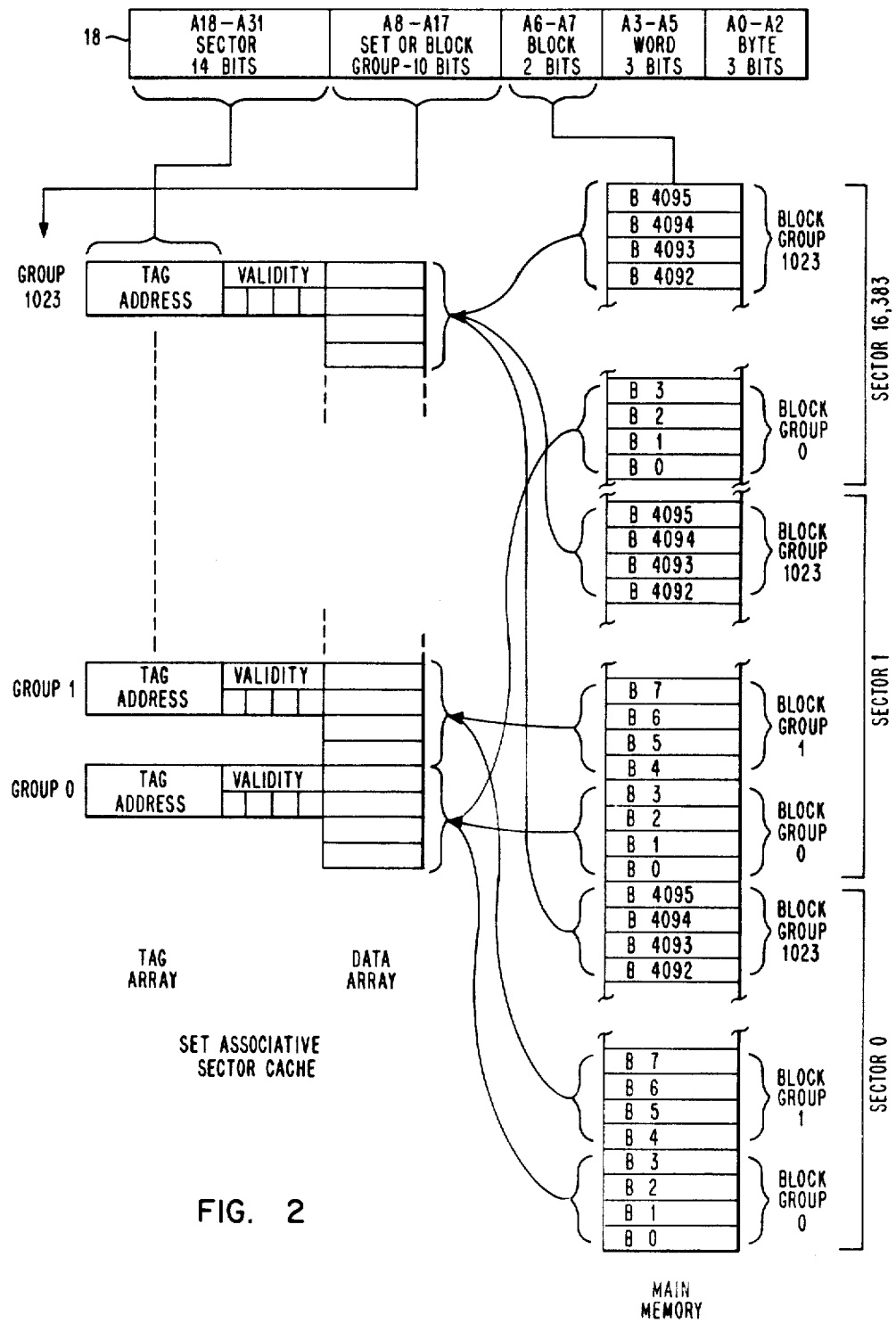
FIG. 2 is a diagram illustrating the mapping relation between data blocks in main memory and the cache memory when constructed in accordance with the invention.

FIG. 2 illustrates the relationship of the set associative sector cache with some of the data units just mentioned. As an example, an effective address 18 is assumed to be composed of 32 binary bits, A0-A31 shown in decreasing significance from left to right. A storage sector in main memory is identified by the 14 most significant bits, A18-A31, which are used as the tag address in one of the storage locations in the tag array of the cache. A second group of ten bits, A8-A17, identifies the set or block group within a sector. In the example, the tag array is assumed to have 1,024 storage locations for tag addresses. Two more bits, A6-A7, form the data block identification for those blocks stored in the data array corresponding to each tag address. For each such address, four data blocks can be stored and the two binary bits can thus identify each of the four for that particular tag address. Word and byte identification each require three bits, A3-A5 and A0-A2, respectively, indicating that there are eight words each having eight bytes present within the block.

The correspondence between blocks within a sector of main memory and the data array in the cache are shown in FIG. 2. It will be seen that four blocks comprise a block group such as blocks B0-B3 which form block group 0 and B4-B7 which form block group 1 in main memory. The data block groups from main memory have preassigned locations as to where they can reside in cache; block group 0 can reside only in the locations reserved for set 0; block group 1 only in the locations reserved for set 1, etc. A "set" in cache is composed of consecutive data blocks, all from the same block group and same sectors. There are numerous block groups, identified as 0, one for each sector, which all compete to reside in set 0 of cache. The cache data array has a capacity adequate to store all of the blocks from one sector or each set of blocks can represent different sectors, as required. The tag addresses define the sectors and these can each be different at a particular instant. Since each tag address is associated with only designated blocks, the tag needs to contain only the sector number to define the sector residing in the cache at the block group of intent. In the assumed example, since there are 1,024 tag addresses and each tag address with its two block bits can identify four blocks, the data array can contain 4,096 addressable block storage locations.

As seen in FIG. 2, each basic subdivision of cache is comprised of one tag address, four validity bits and four data blocks. Each validity bit position designates the validity of a corresponding block in a block group in the data array. When a data block is fetched from main memory and placed in the cache data array, its validity bit is set to the valid state or logical 1. The other blocks within the set or block group do not have to be fetched as long as they are not required. The validity bits in past arrangements have typically been stored in the data array with the data block but their storage in the tag array is quicker and provides more flexibility. For example, the clearing of a group in cache for initialization or use by another sector requires only one operation cycle when the four validity bits are associated with the tag. If they were associated with the data words, clearing would require n operation cycles where n=number of data blocks per set. In addition, if the validity is not associated with the data words, the designer has the flexibility of using a slow, cheaper, denser data array. The validity bits functionally belong with the tag address bits and must be high speed bits for determining hit or miss conditions.

Figure 4:
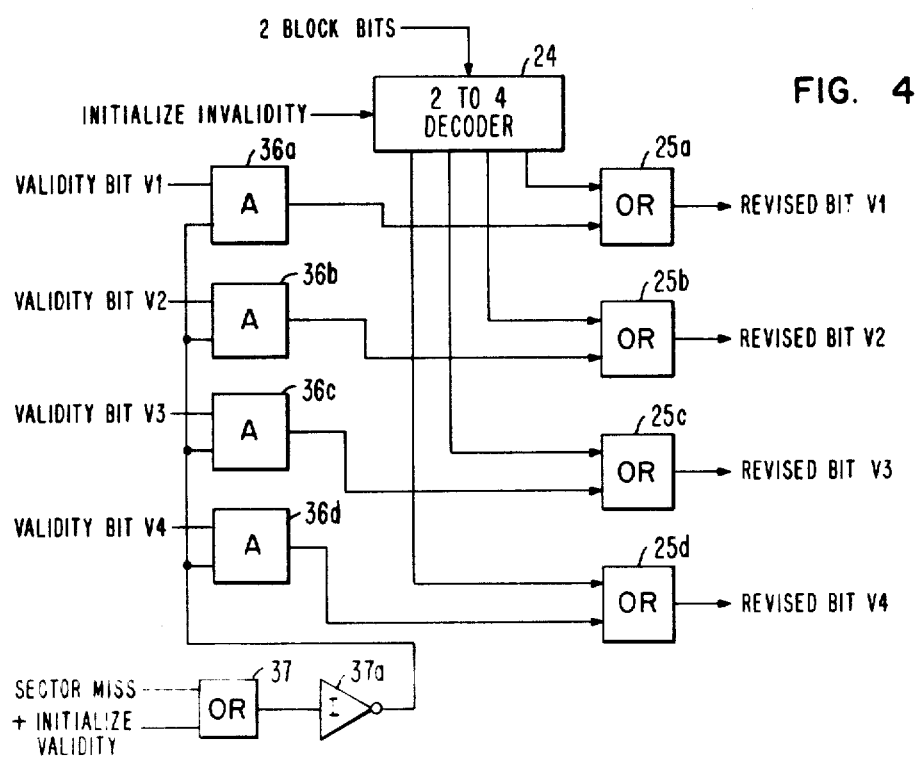
FIG. 4 is a detailed diagram of a validity bit revision circuit shown in FIG. 3.
Figure 3:
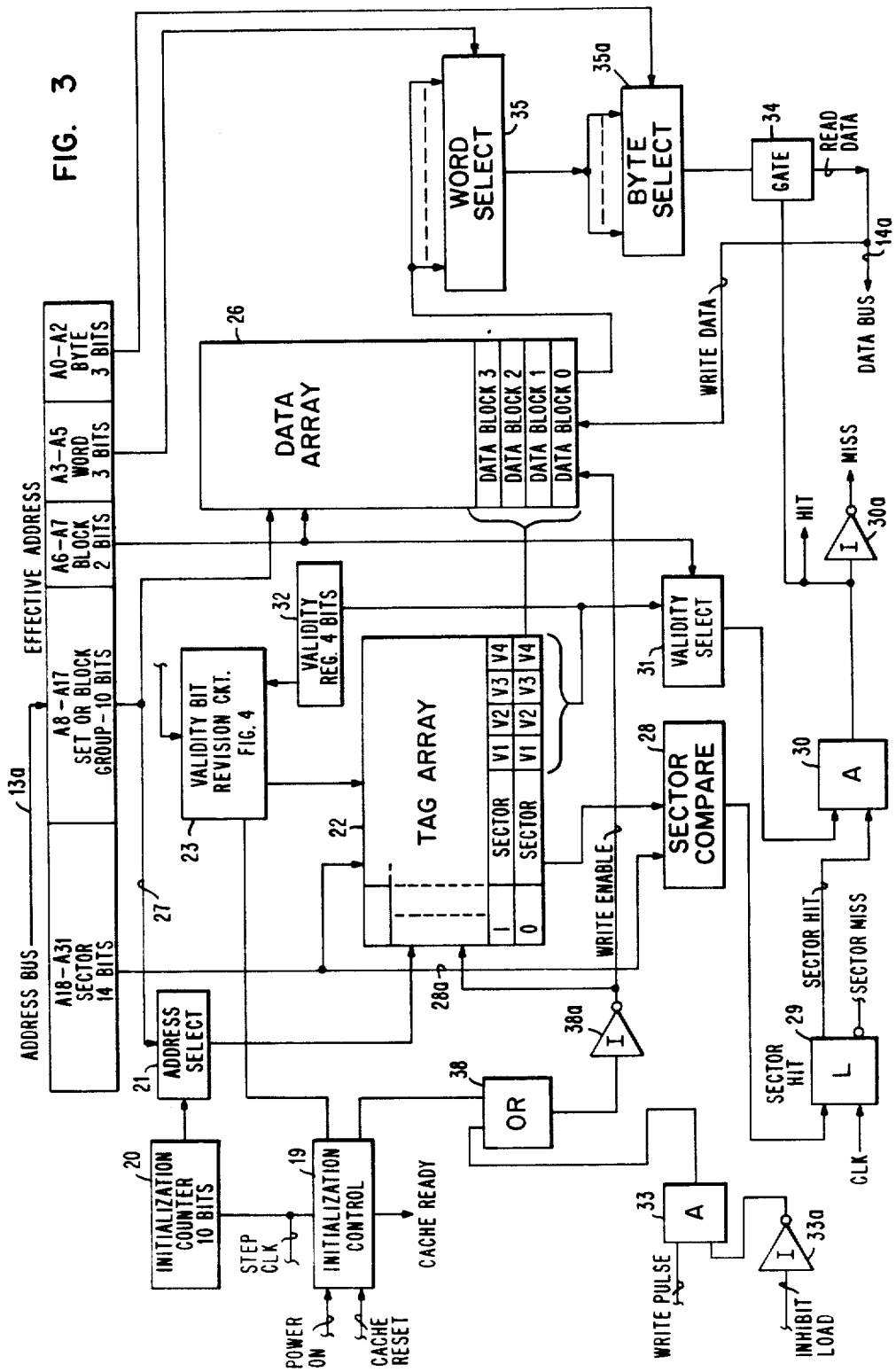
FIG. 3 is a schematic diagram of the cache memory of the invention in conjunction with circuits for reading from or writing into the cache from the main memory bus.

The cache and its control circuits for performing both write and read operations are shown in FIG. 3. Before starting operation, the cache is initialized to insure that all validity bits are set to indicate that their respective data blocks are invalid. The invalidation of all cache data blocks occurs either with a "power on" signal or "cache reset" command transmitted to initialization control circuit 19. Circuit 19 causes an initialization counter 20 to be set to 0. The counter output is selected by address select circuit 21 to serve as a temporary address for tag or index array 22. Initialization circuit 19 further generates a write enable signal at gate 38 and inverter 38a and forces a 0 value on all four validity bit controls coming from the validity bit revision circuit 23, which is shown in FIG. 4. As seen in the latter figure, a 2-to-4 decode circuit 24 is forced to provide 0 outputs to gates 25a-25d which are the respective data to be written into the validity bits in tag array 22 in FIG. 3. Simultaneously, gates 36a-36d are also forced to zero by gate 37 and inverter 37a. Referring again to FIG. 3, a clocking step signal is applied to counter 20 which steps it through a sequence of addresses in the tag array so that the forced binary zeros are recorded in the entire array to indicate invalid data in the cache. When the initialization counter 20 has completed the sequence of tag array addresses through circuit 21, it signals "cache ready" for use at the main memory and cache control logic 17 (of FIG. 1).

The cache, including tag or index array 22 and data array 26, is accessed by each address placed on address bus 13a in FIG. 3. The effective address comprises, as an example, 32 bits, of which the high-order 14 bits are the sector address identification, 10 bits are the set or block group identification, 2 bits are the data block identification, 3 bits are the word identification within a block, and 3 bits form the bit identification within a word. When the address appears, the 10 bit set or block group address is transmitted on bus 27 to both tag array 22 and data array 26. These bits address the corresponding tag word of 14 bits causing it to be read out to sector compare circuit 28. Also appearing at circuit 28 via bus 28a are the 14 sector identification bits from the effective address. Equality of the two 14 bit words enables sector hit latch 29 which indicates the block group resident is from the sector being addressed by the effective address; non-equality defines a sector miss. The compare output also serves as one input to gate 30 for detecting a hit or miss.

Concurrently with the fetching of the sector or tag word from tag array 22, four validity bits V1-V4, a part of the tag word, are also fetched to validity select circuit 31 and to validity register 32. A second input to validity select circuit 31 is the block identification bits from the address. Since these two bits define one of four data blocks, they select one of the validity bits V1-V4 corresponding to the desired data block. In the example, the validity bits in the tag array have been invalidated as to all block groups and a binary 0 is transmitted to the second input to gate 30 whose output remains low indicating a miss through inverter 30a. That is, the data block present in data array 26 is invalid. The low output from gate 30 suppresses gate 34 which would otherwise place the requested block information on the data bus 14a.

It will be recalled that when the effective address was received, a set or block group of 10 bits A8-A17 was also transmitted to data array 26, this information serves as an address for a particular block group in the data array, and the block information of two bits A6-A7 in conjunction therewith, serves as an identification of the particular data block within the group. As a result, the particular data block is transmitted to a word select multiplexer 35. There, in response to the three word bits, A3-A5, one word is selected and transmitted to byte select multiplexer 35a for further decoding by the byte identification of 3 bits, A0-A2. Thus, a particular byte from a data block is present at gate 34 but is blocked from further transmission by the miss signal from gate 30.

New data blocks are loaded into the cache when a miss occurs. In this instance, the desired data block is either invalid or missing from the cache. The block is invalid if an equality signal occurs from sector compare circuit 28, but no output occurs from validity select circuit 31 in FIG. 3. This indicates a sector hit and that there is already a slot in the cache waiting to receive the new data block. The new block must be loaded in the reserved slot and its validity bit set to a 1. The other three validity bits within the tag word must remain unchanged which is accomplished by the validity bit revision circuit shown in FIG. 4.

In FIG. 4, two bits of the effective address identifying the block are decoded at circuit 24 to define a particular data block which is now being loaded. An output equal to one appears on only one of the lines from decoder 24 and is applied to the respective one of gates 25a-25d which produces a logical 1 so that the validity bit for the new data block can now be changed to a 1 in the tag array. The remaining three validity bits remained unchanged by the application of signals from validity register 32 in FIG. 3 to coincidence gates 36a-36d of FIG. 4. These gates pass the state of the validity register through to gates 25a-25d at all times except when there is a sector miss or initialize validity condition as determined by OR gate 37 and inverter 37a. Therefore since neither of these conditions exist, gates 36a-36d transmit to respective OR circuits 25a-25d at the zero level in the example except for that one of the latter gates providing a 1 level due to the selected block from decoder 24. Referring again to FIG. 3, the new data block is loaded into the data array 26 from the data bus 14a and the new validity bits into the tag array 22 from the validity bit revision circuit. The timing is controlled by the main memory and cache control logic 17 of FIG. 1 using a write pulse at the appropriate time. The write pulse is received by OR gate 38 in FIG. 3 from gate 33 and inverted by 38a to enable a write to take place at both the tag and data arrays.

A different type of loading operation occurs if latch 29 records a sector miss during a cache access. In this instance, a replace operation is required which means that a block group from a new sector is to be assigned to cache to replace a previous block group resident there. Note that only one block from the new block group is loaded at this time. This requires that all validity bits must be turned to 0 except for the one data block being loaded, whose validity bit must be a logical 1. This again is accomplished by the validity bit revision circuit of FIG. 4. The logic path for setting the desired block to logical 1 is the same as described above in which the decoder circuit 24 activates the line of interest. The remaining validity bits, however, are set to 0 by the presence of the sector miss signal at OR gate 37 and inverter 37a so that gates 36a-36d are not conditioned. Thus one of the revised bit lines from gates 25a-25d will have the logical 1 as an output while the remaining lines will be at logical 0. The new sector bits from the effective address are simultaneously loaded into the tag array 22 with the new validity configuration while the data block fetched from main memory is loaded into the data array 26, again under control of the write pulse from gate 33 into gate 38.

It will be seen from the above description of the operation for loading the cache that when the desired sector is found in the tag array along with a logical 1 in the validity bit for the desired data block, comparison of the sector at circuit 28 and the checking of the validity at circuit 31 will result in an equality output at gate 30 that will produce a hit signal. Since the set or block group of 10 bits and the block identification pair of bits are concurrently addressing the data array, a data block is being transmitted to word select multiplexer 35 and byte select multiplexer 36. Thus a signal from coincidence gate 30 will activate gate 34 permitting transmission of the selected byte to data bus 14a and to the processor.

When the central processor unit 11 of FIG. 1 sends data to the memory system for storage, the data and its expective address are sent simultaneously to both main memory and cache to be stored in both places. Main memory stores all data; however, the set associative sector cache stores only data for which a sector hit is detected. The operation is identical to adding a new data block to cache as described above for the case where a sector hit occurs.

Although the set associative sector cache of the invention has been described as having certain data capacities, it can be altered to accommodate different needs. Among these are the alternatives of changing the number of tags in the tag array, changing the number of data blocks associated with each tag, or replicating the entire cache to make a multi-way cache. In the above description, the tag array of the example was 1024 words. By doubling the number of tags with the same number of data blocks per tag word the data array would also be doubled. As another alternative, the number of data blocks per tag word can be decreased or increased. If the number of data blocks per tag word were changed to 8, the data array would be doubled in size. Of course, the number of bits in the tag word would also be increased by four per tag word. This increase in data blocks per tag would require less hardware than increasing the number of tag words.

Figure 5:
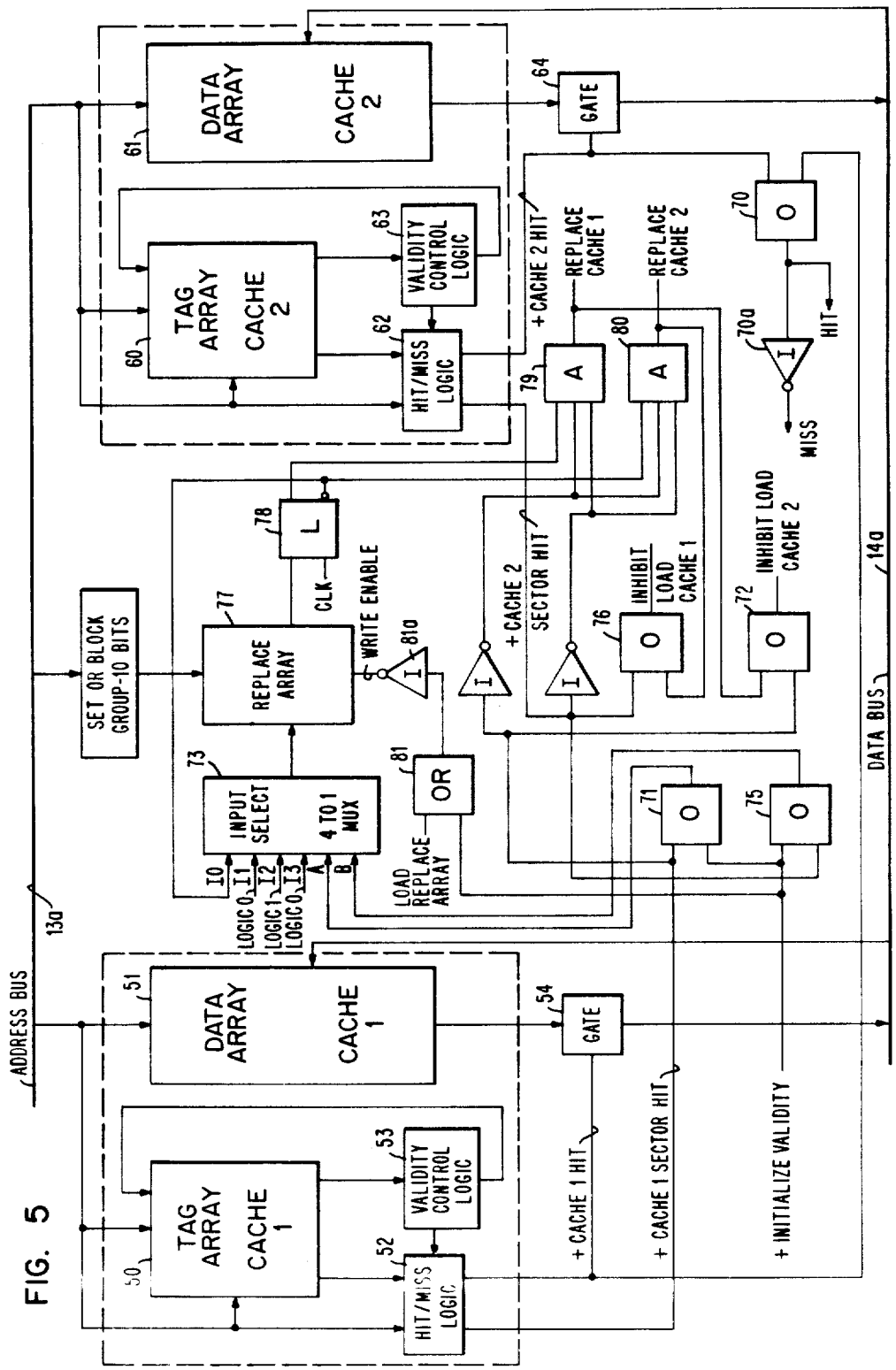
FIG. 5 is a schematic diagram of a multi-cache arrangement using the cache of the invention.

A common technique, presented by Conti as scheme four, of increasing the size of a cache is that of duplicating the entire cache in a set associative manner. The resulting cache is called a two-way set associative cache. Expansion can continue, of course, to such as four-way and eight-way caches. The set associative sector cache of the invention is readily adaptable to such expansion and an example of a two-way cache is shown in FIG. 5. In this approach, new technology is encountered—that of "set". A set is the corresponding basic units of cache (tag word and its block group) residing in different caches. For instance, block group 0 from sector 0 can now be stored in any of a set of locations in cache, one located at cache 1, one located at cache 2, etc. The multiple locations capable of receiving block group 0 are called set 0.

Referring to FIG. 5, a first cache is represented by tag array 50 and its data array 51, while the second cache is represented by tag array 60 and its corresponding data array 61. The tag and data arrays of each cache are suitably connected to address bus 13a so as to simultaneously receive the address issued by the processor. Each tag array has respective hit/miss logic 52, 62 and validity control logic 53, 63 as described above with reference to FIG. 3. Each circuit 52 or 62 is a one block representation of sector comparator 28, latch 29, and gate 30 as shown in FIG. 3. Likewise, each circuit 53 or 63 is a one block representation of validity select 31, validity register 32 of FIG. 3 and the validity revision circuit FIG. 4. Each circuit 52 or 62 provides an indication of a sector hit at latch 29 in a tag array when the sector identification compares on equality to provide an output + cache 1 sector or + cache 2 sector hit. The gate 30 output signal, + cache 1 or + cache 2 hit, serving as a gating signal, gate 54 or 64 for the respective data arrays, is generated if the retrieved data block is valid as determined by circuits 53 or 63 and there is a sector hit for the respective caches in FIG. 5.

When the processor performs a read operation, both caches receive the same effective address and perform a hit/miss check. For instance, if the processor is addressing set 0, the desired sector and block group could be contained in either cache or neither, but not both. The results of the individual hit/miss checks are analyzed in OR gate 70 and inverter 70a to provide a composite hit or miss signal. Only the cache with the hit gates data through its respective gating circuits 54 or 64 onto data bus 14a when a valid data block is found for transmission back to the processor. If neither cache provides a logical 1 output from its respective circuit 52 or 62 to OR gate 70, then a miss is signaled and data must be brought from main memory.

Although a miss is signaled, one of the caches may have had a sector hit or both experienced sector misses. If one cache indicates a sector hit, that cache has a slot reserved for the new data block and will accept a load of that data block. This condition is indicated and an inhibit signal is generated for blocking loading into the other cache. For example, a + cache 1 sector hit signal from circuit 52 of cache 1 will produce an output at OR 72 being an inhibit signal for loading cache 2. Likewise, a cache 2 sector hit signal from circuit 62 provides an input to OR gate 76 with the latter producing an inhibit signal for cache 1 as an output. The signals for inhibiting loading of a cache are transmitted to inverter 33a and AND gate 33 in FIG. 3 and disables the write pulse from generating a write enable signal to the inhibited cache.

If neither cache 1 nor cache 2 experience a sector hit, one of two possible block groups (one in each cache) must be replaced to make room for the new data block. This decision is made from a random access memory designated the replace array 77. The replace array contains a single binary bit position for each set within a two-way cache and the same bit applies to both cache 1 and cache 2. That bit indicates for each set the cache most recently having had a data block read from that set. A bit level for either cache can be arbitrarily assigned. For instance, a logical 0 may indicate cache 1 was most recently used while a logical 1 can represent the same for cache 2.

Replace array 77, like either tag array, is addressed simultaneously by the ten set or block group bits, A8–A17, from the effective address on bus 13a. The addressing of the replace array then causes the selected bit level to be read out for indicating its status in latch 78. The latch outputs are respectively applied to coincidence gates 79 and 80. Coincidence gate 79 provides as an output a replacement gating signal if the latch is on and both tag arrays indicate a sector miss, while gate 80 provides the output gating signal if latch 78 remains off and both tag arrays indicate a sector miss.

For example, if a logical 1 issues from the replace array indicating within the addressed set, cache 2 was most recently used, then latch 78 will be set and gate 79 will provide its output signal indicating replacement of the block group in cache 1. The replacement algorithm uses the rationale that the most recently used data are most likely to be used again; therefore, the least recently used data are replaced. Replace signals from either gates 79 or 80 are transmitted as inputs to respective OR gates 72 and 76 to produce the signals inhibiting loading of the respective caches.

The contents of replace array 77 associated with the set being addressed are loaded after each read operation so as to always reflect the most recently read data. A load replace array pulse is issued by the main memory and cache control logic 17 (FIG. 1) at the end of each read operation which gates through OR 81 and gets inverted in gate 79a to cause the most recent data to be written into the replace array. Selection of the appropriate input to the replace array is through multiplexer 73. The multiplexer can select any of four values (I0–I3) to be loaded into the replace array. The selection is based on control inputs A and B coming from OR gates 71 and 75. During initialization both gates 71 and 75 are forced to logical ones causing input I3 to be selected which contains a logical 0. Thus, during cache initialization, a logical 0 is loaded into each replace array location merely to provide an arbitrary starting point.

If during normal cache operation, cache 1 experiences a sector hit during a read operation, gate 71 is set to a logical 1 and 75 to a logical 0, causing input I1, a logical 0, to be loaded into the replace array. Note that a sector hit in cache 1 causes a 0 to be loaded into the replace array indicating cache 1 was most recently used. Likewise, if cache 2 experiences a sector hit, input I2 is selected and a logical 1 is loaded into the replace array.

If neither cache experiences a sector hit, the inverse of the bit presently stored in the replace array is selected via input I0.

For example, suppose neither cache experiences a sector hit and a 1 is read from the replace array into latch 78. This causes gate 79 to become active and to replace a block group in cache 1, thus making cache 1 the most recently used. Therefore, the inverse of latch 78, a logical 0 is loaded into the replace array, defining cache 1 as the most recently used.

It is seen from the foregoing description that a more efficient cache storage apparatus has been disclosed. The increase in the number of data blocks per tag word enables a decrease in the circuit cost per block of cache memory without a loss of retrieval time. The invention can be adapted readily to cache designs and varied in size without the addition of a complex control circuit.

While the invention has been particularly shown and described with reference to preferred embodiments thereof, it will be understood by those skilled in the art that various changes in form and details may be made therein without departing from the spirit and scope of the invention.

What is claimed is:

1. In a data processing system including a main memory divided into sectors, each sector of the main memory including a plurality of data blocks, each data block including a plurality of data word locations, a cache memory and control means for temporarily storing selected ones of said plurality of data blocks, and a processor means connected to said main memory and to said cache memory and control means for processing data, for issuing memory addresses, and for fetching blocks of data from the cache memory or from said main memory in accordance with the issued memory addresses, said cache memory and control means comprising:
    an initialization control for developing an output signal representing initialization control signals;
    data array means for temporarily storing the selected ones of said plurality of data blocks;
    tag array means for storing a plurality of address information therein indicative of the addresses in said main memory of the selected data blocks temporarily stored in said data array means, said address information including sector address data representative of a desired sector of said main memory wherein the data is stored, block address data representative of a desired data block of the desired sector wherein the data is stored, and validity bit data representative of the existance of the data in a desired word location of the desired data block; and
    validity bit revision means connected to an output from said initialization control, connected to an output from said tag array means representative of said validity bit data of said address information stored therein, and responsive to a portion of the memory address issued by said processor means for revising and changing one or more of the validity bits of said validity bit data stored in said tag array means during an initialization period in response to said output signal from said initialization control and in accordance with said portion of the memory address issued by said processor means.

2. The cache memory and control means of claim 1, further comprising:
    address select means responsive to another portion of the memory address issued by said processor means, representative of said desired data block of the desired sector wherein the data is stored, for selecting one of said plurality of address information stored in said tag array means, the selected one of said plurality of address information including a selected sector address data and a selected validity bit data.

3. The cache memory and control means of claim 2, further comprising:
    sector compare means responsive to a further portion of the memory address issued by said processor means, representative of an address indicating the desired sector in the cache or the main memory wherein the data is stored, and responsive to said selected sector address data selected by said address select means for developing an output signal when said further portion of the memory address issued by said processor means and said selected sector address data selected by said address select means represent the same address.

4. The cache memory and control means of claim 3, further comprising:

validity select means responsive to the selected validity bit data selected by said address select means and to said portion of the memory address issued by said processor means for selecting a validity bit of said selected validity bit data in accordance with said portion of the memory address issued by said processor means, for developing a first output signal of one polarity when the selected validity bit has one binary state and for developing a second output signal of a polarity opposite to said one polarity when the selected validity bit has a binary state opposite to said one binary state.

5. The cache memory and control means of claim 4, further comprising:

gate means responsive to said output signal from said validity select means and to said output signal form said sector compare means for developing a hit signal in response to the existance of said output signal from said sector compare means and to said first output signal from said validity select means and for developing a miss signal in response to the existance of said output signal from said sector compare means and to said second output signal from said validity select means, said gate means developing said miss signal in response to the absnece of said output signal from said sector compare means.

6. The cache memory and control means of claim 1 or 5, further comprising:

word select means connected to said data array means, responsive to one of the selected data blocks temporarily stored in said data array means, and responsive to a fourth portion of the memory address issued by said processor means for selecting a word from a word location associated with said one of the selected data blocks in accordance with said fourth portion of the memory address, for storing said word therein, and for developing an output signal indicative of the stored word; and byte select means responsive to the output signal from said word select means and to a fifth portion of the memory address issued by said processor means for selecting a byte of said word stored in said word select means in accordance with said fifth portion of the memory address issued by said processor means, for storing said byte therein, and for developing an output signal indicative of the stored byte of said word.

7. The cache memory and control means of claim 6, further comprising:

further gate means responsive to said output signal from said byte select means and responsive to said hit signal and said miss signal for developing an output signal in response to said hit signal, said output signal being representative of a series of bytes of the word stored in said word select means, said word being associated with the blocks of data fetched from said data array means of said cache memory by said processor means, said further gate means not developing said output signal in response to said miss signal.

* * * * *